(12) United States Patent
Sandmeyer et al.

(10) Patent No.: US 8,409,710 B2
(45) Date of Patent: Apr. 2, 2013

(54) PARTICLES WITH STRUCTURED SURFACE

(75) Inventors: Frank Sandmeyer, Burgkirchen (DE);
Herbert Barthel, Mehring (DE);
Torsten Gottschalk-Gaudig, Mehring (DE)

(73) Assignee: Wacker Chemie AG, Munich (DE)

( * ) Notice: Subject to any disclaimer, the term of this patent is extended or adjusted under 35 U.S.C. 154(b) by 163 days.

(21) Appl. No.: 13/105,265

(22) Filed: May 11, 2011

(65) Prior Publication Data

US 2011/0268919 A1   Nov. 3, 2011

Related U.S. Application Data

(62) Division of application No. 12/295,456, filed as application No. PCT/EP2007/052511 on Mar. 16, 2007, now Pat. No. 7,972,696.

(30) Foreign Application Priority Data

Mar. 30, 2006 (DE) .......................... 10 2006 014 875

(51) Int. Cl.
*B32B 5/16* (2006.01)
(52) U.S. Cl. ........ 428/404; 428/402; 428/403; 523/204; 524/492; 524/493
(58) Field of Classification Search .................. 428/402, 428/403, 404; 523/204; 524/492, 493
See application file for complete search history.

(56) References Cited

U.S. PATENT DOCUMENTS

| | | |
|---|---|---|
| 3,294,725 A | 12/1966 | Dow Corning |
| 3,354,022 A | 11/1967 | du Pont |
| 4,370,160 A | 1/1983 | Ziemelis |
| 4,618,645 A | 10/1986 | Bauman et al. |
| 5,045,231 A | 9/1991 | Braun et al. |
| 5,064,894 A | 11/1991 | Desmonceau et al. |
| 5,492,945 A | 2/1996 | Morita et al. |
| 5,686,054 A | 11/1997 | Barthel et al. |
| 5,945,471 A | 8/1999 | Morita et al. |
| 5,948,469 A | 9/1999 | Morita et al. |
| 6,013,682 A | 1/2000 | Dalle et al. |
| 6,251,313 B1 | 6/2001 | Deubzer et al. |
| 6,262,171 B1 | 7/2001 | Mayer et al. |
| 6,660,363 B1 | 12/2003 | Barthlott |
| 7,399,803 B2 | 7/2008 | Morita et al. |
| 7,541,405 B2 | 6/2009 | Gottschalk-Gaudig et al. |
| 2002/0142150 A1 | 10/2002 | Baumann et al. |
| 2003/0021997 A1 | 1/2003 | Veerasamy et al. |
| 2003/0044612 A1 | 3/2003 | Kaeding et al. |
| 2004/0081818 A1 | 4/2004 | Baumann et al. |
| 2004/0131527 A1 | 7/2004 | Gottschalk-Gaudig et al. |
| 2005/0107520 A1 | 5/2005 | Gottschalk-Gaudig et al. |
| 2009/0176920 A1 | 7/2009 | Sandmeyer et al. |

FOREIGN PATENT DOCUMENTS

| | | |
|---|---|---|
| CA | 2 260 470 A1 | 7/1999 |
| CN | 1624024 A | 6/2005 |
| DE | 100 63 739 A1 | 6/2002 |
| DE | 102 33 829 A1 | 2/2004 |
| EP | 0 433 727 A1 | 6/1991 |
| EP | 0 516 057 A1 | 12/1992 |
| EP | 0 772 514 B1 | 5/1997 |
| EP | 0 909 747 A1 | 4/1999 |
| EP | 0 933 388 A2 | 8/1999 |
| EP | 0 941 761 A2 | 9/1999 |
| EP | 1 433 749 A1 | 6/2004 |
| JP | 2-240142 | 9/1990 |
| JP | 4-348143 | 12/1992 |
| JP | 7-102075 | 4/1995 |
| JP | 9-208709 | 8/1997 |
| JP | 9-241511 | 9/1997 |
| JP | 09241511 A | 9/1997 |
| WO | 02/064266 A2 | 8/2002 |
| WO | 2005092989 A1 | 10/2005 |

OTHER PUBLICATIONS

Ming, W., Wu, D., van Benthen, R., de With, G. Nano Letters, vol. 5, No. 5, p. 2298, 2005.
Cauvin, S., Colver, P.J. Bon, S.A.F. Macromolecules, vol. 38, p. 7887, 2005.
Weyenberg, D.R., Findlay, D.E., Cekada Jr., J., Bey, A.E. J. Polymer Sci. Part C., No. 27, p. 27-34, 1969.
Chen, M., Zhou, S., You, B., Wu, L. Macromolecules, vol. 38, p. 6411, 2005.

*Primary Examiner* — Edward Cain
(74) *Attorney, Agent, or Firm* — Brooks Kushman P.C.

(57) ABSTRACT

Particles with a structural surface which are useful to produce abrasion resistant self-cleaning surfaces contain particulate solid particles having a superstructured overlayer of fine particles. The particles may be prepared by polymerizing a polymerizable siloxane, silane, or mixture thereof in a Pickering emulsion.

12 Claims, 2 Drawing Sheets

PARTICLES WITH STRUCTURED SURFACE

CROSS-REFERENCE TO RELATED APPLICATION

Figure 1:
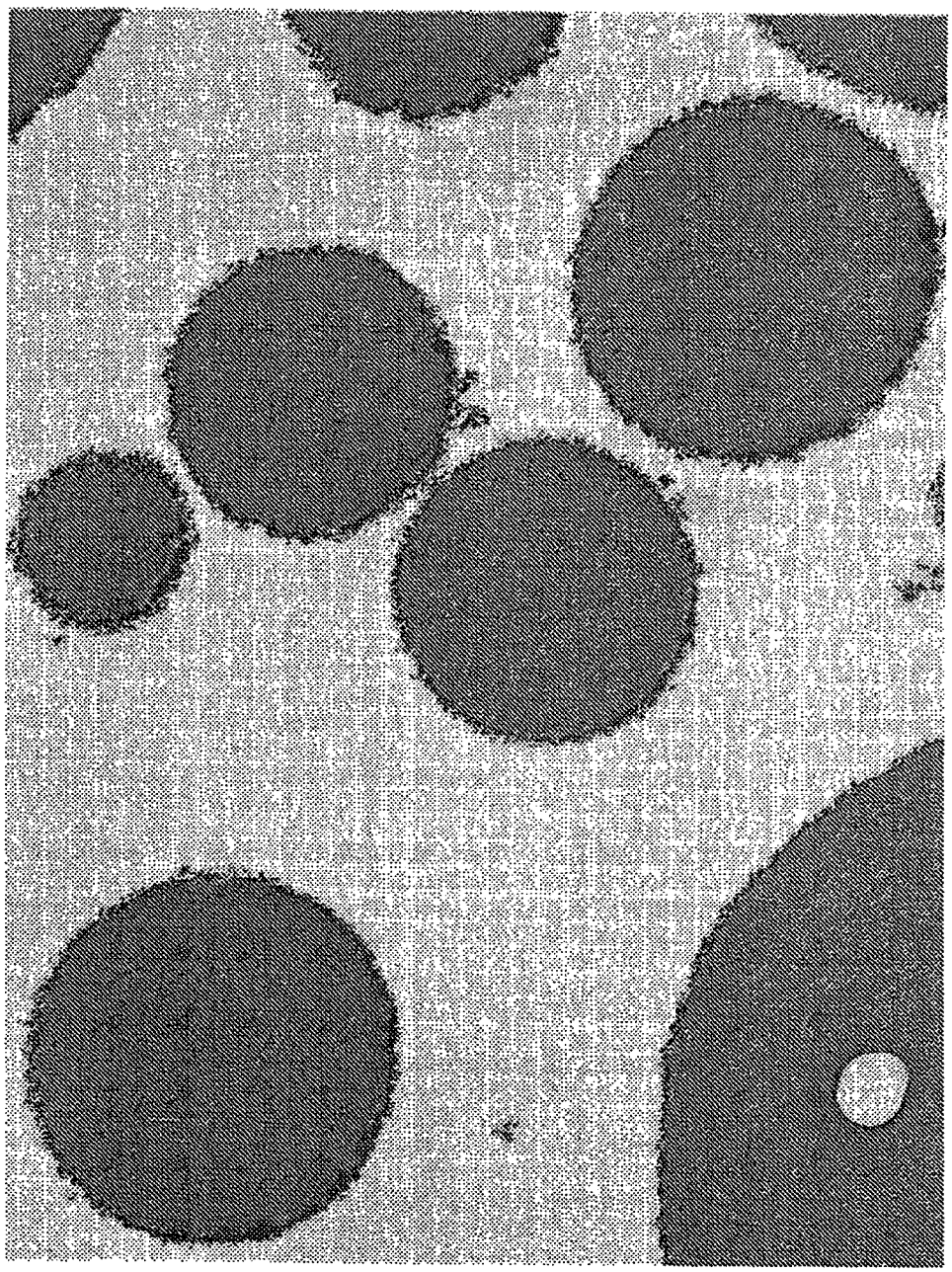

This application is a division of U.S. application Ser. No. 12/295,456, filed Sep. 30, 2008 (now pending), which is the U.S. national phase of PCT Appln. No. PCT/EP2007/052511 filed Mar. 16, 2007 which claims priority to German application DE 10 2006 014 875.4 filed Mar. 30, 2006.

BACKGROUND OF THE INVENTION

1. Field of the Invention

It is known that to achieve a good self-cleaning effect of a surface, the surface must have a microrough surface structure as well as good hydrophobicity. Both features are realized in nature, for example, in the lotus leaf. The surface formed from a hydrophobic material has relatively large spherical elevations, which can be described as studs, which sit so close to one another that a water drop does not fit between them and thus only sits on the tips of the studs. Besides these relatively large elevations, both the surface of the rest of the lotus leaf and also the surface of the relatively large elevations themselves are in turn substructured by relatively small elements, in the case of the lotus leaf, wax particles. Overall, this gives a structure which consists of elevations and depressions of from sometimes less than 100 nm ranging to 30 μm.

2. Description of the Related Art

Water-repellant surfaces with a microrough structure with elevations and depressions are described in U.S. Pat. No. 3,354,022 with processing here being with a hydrophobic material, in particular a fluorine-containing polymer. According to one embodiment, a surface with self-cleaning effect can be applied to ceramic tiles or to glass by coating the substrate with a suspension which comprises glass beads with a diameter in the range from 3 to 12 μm and a fluorocarbon wax based on a fluoroalkylethoxy-methacrylate polymer. Disadvantages of such coatings are their low abrasion resistance and moderate self-cleaning effect.

The laid-open specification EP 0 909 747 A1 teaches a method for producing a self-cleaning property of surfaces, in particular roof tiles. The surface has hydrophobic elevations with a height of from 5 to 200 μm. A surface of this type is produced by applying a dispersion of powder particles from an inert material in a siloxane solution and subsequent curing. As in the previously acknowledged method, the structure-forming particles are not fixed to the surface of the substrate in an abrasion-stable manner.

EP patent 0 772 514 teaches self-cleaning surfaces of objects with an artificial surface structure of elevations and depressions, where the distance between the elevations is in the range from 5 μm to 200 μm and the height of the elevations is in the range from 5 μm to 100 μm and the structure consists of hydrophobic polymers or lastingly hydrophobized materials. Suitable for forming the structure are etching and embossing methods, and also coating methods such as adhering a hydrophobic polymer. If required, structure formation is followed by hydrophobization, for example a silanization. The self-cleaning surfaces, such as coatings of vehicles, i.e. surfaces to be cleaned by readily moved water, must not be subjected to strong mechanical stresses since this causes the ability for self-cleaning to be lost.

The DE application DE 100 63 739 teaches substrates such as glass, ceramic, plastic and metal, as well as glazed and enameled substrates, with a self-cleaning surface. The self-cleaning surface comprises structure-forming particles with a mean diameter of less than 100 nm, in particular less than 50 nm, but at least 5 nm and a layer-forming material which is an inorganic or organic material. The structure-forming particles are fixed to the substrate by means of the layer-forming material. Some of the primary particles and/or agglomerates of the same protrude at least partially from the surface either themselves, or coated with layer-forming material, and in so doing form elevations and depressions in the nanoscale range. The structured surface has a hydrophobic coating at least in parts. To produce these types of self-cleaning surfaces, a composition which comprises structure-forming particles and an organic or inorganic layer-forming material is applied to the substrate by means of known coating methods, for example a lacquer. The formation of a coherent and firmly adhering layer by a thermal treatment is followed by a hydrophobization, e.g. using fluorine-containing silanes and/or fluorine-containing siloxanes. The formation of the surface structure and the hydrophobization take place in this method in separate steps.

WO 02/064266 describes a self-cleaning paint coating comprising a base paint coat and a topcoat with an artificial surface structure, formed from particles, of elevations and depressions, wherein the particles have an average particle diameter of less than 100 nm, are bonded at least partially by means of a binder system in the topcoat, the mean height and the mean distance between the elevations are less than 50 nm, and the surface or topcoat is at least partially hydrophobic. The disclosed self-cleaning paint coating has a nanoscale surface structure with hydrophobic character. Since the structure-forming primary particles, with diameters of <100 nm, preferably <50 nm to about 5 nm, can also form agglomerates, the surface structure apart from the specified elevations and depressions can also exhibit a superstructure with greater distances and heights. In general, the average heights and distances of the elevations of the superstructure are still significantly below 1 μm. The structure-imparting particles may be organic or inorganic materials.

DE 102 33 829 A1 describes a method for generating a lotus structure by applying the particles in dry form by electrostatic spraying by means of powder spray guns.

It is common to all of these inventions that they either describe a coarse structure with structural elements in the μm range or deal with very small nanoscale structural elements which produce corresponding fine structures. A combination of a structure that is at least a few μm in size which a very fine nanoscale substructure covered with structural elements which are smaller than 500 nm is not known. However, precisely this surface structure of a combination of relatively large structural elements which a smaller-dimensioned substructure overlies, is the characteristic surface structure of the lotus leaf surface. In particular, this fine structure in the case of the lotus leaf is present both on the leaf surface which lies between the relatively large elevations, and also on the larger elevations which covers them to a certain extent. By combining relatively small and relatively large particles, although it is possible to produce a combination of relatively small and relatively large elevations, the relatively small particles collect in the gaps between the relatively large ones, as a result of which the packing density increases, and do not cover the relatively large particles. This technical principle is utilized in order to increase the packing density in coatings by combining large and small particles.

Similarly structured surfaces with hydrophobic properties are taught in EP 0 933 388 A2. The surface has elevations with a mean height of from 50 nm to 10 μm and a mean distance between 50 nm and 10 μm, and also a surface energy of the unstructured material of from 10 to 20 mN/m. To achieve a particularly low surface energy and thus hydrophobic and oleophobic properties, the structured surface has fluorine-containing polymers or it has been treated using alkylfluorosilanes.

A combination, as described above, of a coarse structure which is coated in a targeted manner by a fine structure is not described here either.

EP 0 433 727 A1 describes silicon-based core-shell particles in which the core consists of colloidal silica and the shell of siloxanes or siloxane condensates. The particle size is between 4 and 400 nm.

US 2003/0044612 A1 claims core-shell particles which comprise a porous core of an organic polymer and a shell of inorganic colloidal material, preferably colloidal silica.

A belief has developed that a targeted fine structuring of a coarsely structured surface can only be achieved through the combination of fine particles and relatively large particles, where the relatively large particles must bring with them the fine structure which can be achieved by the smaller particles on their own, already firmly anchored to their surface. This is because, as a result of subsequent application of a coating material which comprises the smaller particles to a coarsely structured surface, the phenomenon described above always arises to a certain degree, that the relatively small particles do not accumulate on the tips of the raised areas of the surface structure, but in between them, for which reason inhomogeneous distribution of the fractions that impart a fine structure is unavoidable.

SUMMARY OF THE INVENTION

It is therefore an object of the present invention to provide particles which achieve a self-cleaning effect of the surface. These and other objects are achieved by the present invention, which provides particles comprising at least one polymerization product of a polyaddable, polycondensable or polymerizable siloxane and/or silane and at least one particulate solid, where the mean particle size of the particulate solid is smaller than the mean particle size of the polymer particles without particulate solid.

DETAILED DESCRIPTION OF THE PREFERRED EMBODIMENTS

The particles according to the invention preferably comprise at least one polymerization product of a polycondensable, polyaddable or polymerizable siloxane composed of repeat units of the general formula (1)

$$[A^1_z R^1_p SiO_{(4-p-z)/2}] \quad (1),$$

$A^1$ is a hydrogen or hydrocarbon radical which contains up to 30 carbon atoms and can additionally contain heteroatoms selected from O, S, Si, Cl, F, Br, P or N atoms, such that $A^1$ can also be a functional group which is optionally itself unsubstituted or substituted, $R^1$ is an alkoxy or aryloxy radical having up to 18 carbon atoms, hydroxy radical or H, or which, independently of $A^1$, can have its meaning as well, z and p are in each case 0, 1, 2 or 3 or at least one polymerization product of a polycondensable, polyaddable or polymerizable silane of the general formula (2), $$(R^2)_{4-n}Si(OR^3)_n \quad (2)$$

where n is a number of 1, 2, 3 or 4, $R^2$ is a linear or branched alkyl radical having 1 to 16 carbon atoms, where nonadjacent carbon atoms can be replaced by oxygen atoms, is an aryl radical or is an organofunctional radical selected from among phosphonic acid monoester radicals, phosphonic acid diester radicals, the phosphonic acid radical, the methacryloyloxy radical, the acryloyloxy radical, the vinyl radical, the mercapto radical, the isocyanato radical, where the isocyanato radical can optionally be reaction-blocked to protect against chemical reactions ("blocked isocyanate"), the hydroxy radical, hydroxyalkyl radicals, the vinyl radical, the epoxy radical, the glycidyloxy radical, the morpholino radical, the piperazino radical, a primary, secondary or tertiary amino radical with one or more nitrogen atoms, where the nitrogen atoms can be substituted by hydrogen or monovalent aromatic, aliphatic or cycloaliphatic hydrocarbon radicals, carboxylic acid radicals, carboxylic anhydride radicals, aldehyde radicals, urethane radicals, or urea radicals, where the radical $R^2$ can be bonded directly to the silicon atom or be separated therefrom by a carbon chain of 1-6 carbon atoms, and $R^3$ is a monovalent linear or branched aliphatic or cycloaliphatic hydrocarbon radical in which nonadjacent carbon atoms can be replaced by heteroatoms such as O, N, P, S, Cl, F, Br or Si, where the free valences of the heteroatoms in question may be saturated by linear or branched alkyl radicals or by hydrogen atoms, or is a monohydric aromatic hydrocarbon radical or a radical of the form —C(=O)—$R^3$ where $R^3$ is a monovalent linear or branched aliphatic or a cycloaliphatic hydrocarbon radical or a monovalent aromatic hydrocarbon radical, where the selected silane or optionally the selected silanes can be present in nonhydrolyzed form, in hydrolyzed form or in hydrolyzed and partially condensed or hydrolyzed and condensed form or in a mixture of these forms, or at least one polymerization product of a polycondensable, polyaddable or polymerizable preparation, a plurality of such siloxanes of repeat units of general formula (1) and/or silanes of formula (2), and at least one particulate solid, where the mean particle size of the particulate solid is smaller than the mean particle size of the polysiloxane particles without particulate solid.

Preferably, the particulate solid used according to the invention is a metal oxide with a covalent binding fraction in the metal-oxygen bond, such as, for example, solid oxides of the main-group and subgroup elements, such as of the third main group, such as boron oxide, aluminum oxide, gallium oxide or indium oxide, of the 4th main group, such as silicon dioxide, germanium dioxide, and tin oxide and dioxide, lead oxide and dioxide, or an oxide of the subgroup (transition group) elements, such as titanium dioxide, zirconium dioxide, hafnium dioxide, cerium oxide or iron oxide.

Preferably, the metal oxides used according to the invention are aluminum(III) oxides, titanium(IV) oxides and silicon(IV) oxides, such as silicas prepared by wet-chemical methods, for example precipitated silica, or silica gels, or aluminum oxides, titanium dioxides or silicon dioxides produced in processes at elevated temperature, such as, for example, fumed aluminum oxides, titanium dioxides or silicas, with fumed silica being particularly preferred.

Preferably, the fumed silicas are silanized fumed silicas with a methanol number of less than 70.

Very particular preference is given to, in part, metal oxides wettable with water, as described in EP 1433749 A1.

In this connection, the mean particle size of the finely divided particles or optionally aggregates of the particles is less than the mean particle size of the polymer particles comprising at least one polymerization product of a polyaddable, polycondensable or polymerizable siloxane and/or silane without the finely divided particles.

The mean particle size of the particulate solids used is less than 1000 nm, preferably between 10 nm and 800 nm, more preferably between 50 nm and 500 nm and most preferably between 75 nm and 300 nm, in each case measured as the mean hydrodynamic equivalent diameter by means of photon correlation spectroscopy at 173° backscattering using a nanosizer ZS from Malvern.

The methanol number of the particulate solids used is less than 70, preferably less than 65 and more preferably less than 60. Preferably, the methanol number of the silanized silicas used is less than 70, preferably less than 65 and more preferably less than 60. To determine the methanol number, defined mixtures of water with methanol are prepared and then the surface tensions of these mixtures are determined using known methods. In a separate experiment, these water-methanol mixtures are coated with defined amounts of particles and shaken under defined conditions (for example gentle shaking by hand or using a tumble mixer for about 1 minute). Determinations are made on the water-alcohol mixture in which the particles just still do not sink in and the water-alcohol mixture with a higher alcohol content in which the particles just sink in. The surface tension of the latter alcohol-water mixture gives the critical surface energy $\gamma_{crit}$ as a measure of the surface energy $\gamma$ of the particles. The methanol content in water gives the methanol number.

The carbon content of the particulate solids used is greater than 0% by weight, preferably 0.1-4% by weight, more preferably 0.25-3.5% by weight and most preferably 0.5-3% by weight, measured by means of elemental analysis on the dry particulate solids.

To produce the particles according to the invention, any method is suitable which involves at least the two steps:
1. Preparation of a three-phase mixture of a continuous phase in which the siloxane or silane is not soluble or with which it is not miscible and a discontinuous siloxane or silane phase, where the continuous and discontinuous siloxane or silane phases are separated from one another by the finely divided metal oxides, which themselves form the third phase.
2. Condensation or polymerization of the discontinuous phase without the continuous phase being changed as a result.

The invention provides a method for producing particles, characterized in that an oil phase comprising at least one polyaddable, polycondensable or polymerizable siloxane of the general formula (1)

$$[A^1_z R^1_p SiO_{(4-p-z)/2}] \quad (1),$$

where
$A^1$ is a hydrogen or hydrocarbon radical which contains up to 30 carbon atoms and can additionally contain heteroatoms selected from O, S, Si, Cl, F, Br, P or N atoms, such that $A^1$ can also be a functional group which is optionally itself unsubstituted or substituted,
$R^1$ is an alkoxy or aryloxy radical having up to 18 carbon atoms, a hydroxy radical or H, or which, independently of $A^1$, can have its meaning,
z and p are in each case 0, 1, 2 or 3
or at least one polyaddable, polycondensable or polymerizable silane of the general formula (2),

$$(R^2)_{4-n}-Si-(OR^3)_n \quad (2)$$

where n is a number with a value of 1, 2, 3 or 4,
$R^2$ is a linear or branched alkyl radical having 1 to 16 carbon atoms, where nonadjacent carbon atoms can be replaced by oxygen atoms, is an aryl radical or is an organofunctional radical selected from among phosphonic acid monoester radicals, phosphonic acid diester radicals, the phosphonic acid radical, the methacryloyloxy radical, the acryloyloxy radical, the vinyl radical, the mercapto radical, the isocyanato radical, where the isocyanato radical can optionally be reaction-blocked to protect against chemical reactions ("blocked isocyanate"), the hydroxy radical, hydroxyalkyl radicals, the vinyl radical, the epoxy radical, the glycidyloxy radical, the morpholino radical, the piperazino radical, a primary, secondary or tertiary amino radical with one or more nitrogen atoms, where the nitrogen atoms can be substituted by hydrogen or monovalent aromatic, aliphatic or cycloaliphatic hydrocarbon radicals, carboxylic acid radicals, carboxylic anhydride radicals, aldehyde radicals, urethane radicals, or urea radicals, where the radical $R^2$ can be bonded directly to the silicon atom or be separated therefrom by a carbon chain of 1-6 carbon atoms, and
$R^3$ is a monovalent linear or branched aliphatic or cycloaliphatic hydrocarbon radical in which nonadjacent carbon atoms can be replaced by heteroatoms such as O, N, P, S, Cl, F, Br or Si, where the free valences of the heteroatoms in question may be saturated by linear or branched alkyl radicals or by hydrogen atoms, or is a monovalent aromatic hydrocarbon radical or a radical of the form —C(=O)—$R^3$ where $R^3$ is a monovalent linear or branched aliphatic or a cycloaliphatic hydrocarbon radical or a monovalent aromatic hydrocarbon radical, where the selected silane or optionally the selected silanes may be present in nonhydrolyzed form, in hydrolyzed form or in hydrolyzed and partially condensed or hydrolyzed and condensed form or in a mixture of these forms,
or a preparation of a plurality of such siloxanes of the general formula (1) and/or silanes of the formula (2)
are emulsified with particulate solids in aqueous medium.

Typically, such three-phase mixtures are emulsions of water-insoluble and water-immiscible siloxanes or silanes which are stabilized by means of partially hydrophobized metal oxide particles, such as silicas in the aqueous phase (Pickering emulsions). The polymerizable or condensable silanes or siloxanes are polymerized or condensed after the emulsification in a method suitable for producing the particles according to the invention. If appropriate, the siloxanes or silanes have to be hydrolyzed before the condensation if these are, for example, alkoxy- or acetoxy-substituted silanes or siloxanes. In the case of sufficiently reactive silanes and siloxanes, just the water present brings about, if appropriate, the hydrolysis and subsequently the condensation. In the case of less reactive silanes and siloxanes, catalysts are required which, if appropriate, bring about the hydrolysis and the condensation of the siloxanes and silanes. These catalysts may either be acids or bases, or else metal catalysts, such as group IV transition metal catalysts, tin catalysts, etc., as are usually used for increasing the rate of hydrolyses, condensation reactions or transesterification reactions. Suitable acids or bases are, besides the known mineral acids and metal salts, also acidic or basic silanes or siloxanes.

Preferred basic catalysts are NaOH, KOH, ammonia and $NEt_3$.

Preferred acidic catalysts are p-toluenesulfonic acid, aqueous or gaseous HCl, sulfuric acid.

If the method includes a polymerization reaction, this may, for example, be a free-radical polymerization reaction of an olefinically unsaturated siloxane or silane.

The method should be carried out such that the finely divided particulate metal oxides stabilizing the siloxane or silane phase react during the condensation reaction or the polymerization reaction with the surface of the condensation products or polymerization products forming the cores, or at least enter into a stable interaction, such as hydrogen bonds, van der Waals interactions or another directed interaction, or a combination of such directed interactions, so that the finely divided particulate metal oxides stabilizing the siloxane or silane phase are anchored permanently on the cores of the condensation products or polymerization products of the siloxanes and/or silanes.

The particles according to the invention are either automatically hydrophobic as a result of the effect of the silanes or siloxanes used without further action, or they can be subsequently hydrophobized through surface treatment. In this connection, the shell of the particles, which consists of the metal oxides which stabilize the siloxanes or silane phase and which are at most partially wettable with water, can, for example, be silanized. Here, alkylalkoxysilanes that are hydrolyzable in water are used; these condense after the hydrolysis on the particulate metal oxides stabilizing the siloxane phase or silane phase and thus provide said oxides with a hydrophobic coating. If such silanes or else correspondingly hydrolyzable and condensable siloxanes are already used for preparing the polymeric phase of the particles according to the invention, a subsequent hydrophobization is generally no longer required.

EP 0 941 761 A2 teaches a method for the microencapsulation of products with organosiloxane walls. This method is likewise suitable for the subsequent hydrophobization of the particles according to the invention. If appropriate, slight adaptations have to be made which take into consideration the modified solubility and dispersion behavior of the particles according to the invention compared with the products to be encapsulated in EP 0 941 761 A2.

The size of the particles according to the invention can be controlled, for example, through emulsion technology, i.e. for example through parameters such as the introduced shear energy, the volume fraction of the dispersed organosilicon phase, the amount of stabilizing finely divided metal oxide particles, the pH of the continuous water phase and its ionic strength, the viscosity, the order of the metered addition, the metering rate, or through the procedure, i.e. for example through the reaction temperature, the reaction time, the concentrations of the raw materials used. The selection and the amount of the optionally used hydrolysis and condensation catalyst likewise has an influence on the particle size.

When using emulsion technology which permits the production of relatively small droplets, small surface-structured particles are obtained by this method. For this, it is possible, for example, to use other shear energies or a selection of other amphiphilic particles for stabilizing the condensable liquid or preparation in water. It is also possible to obtain corresponding particles according to the invention using condensable or polymerizable emulsifiers instead of particles, in which case the emulsifiers are condensed or polymerized subsequently to or at the same time as the condensation of the condensable liquid or preparation, thus producing the shell.

For preparing the particle-stabilized Pickering emulsion it is possible to use all of the methods for producing emulsions that are known to the person skilled in the art. However, it has been found that particularly highly suitable emulsions for producing the particles according to the invention can be obtained according to the following methods:

Method 1:
Initial introduction of an optionally highly concentrated particle dispersion in the medium, which later constitutes the homogeneous phase, where the initially introduced volume is such that it comprises the total amount of required finely divided metal oxide particles.

Slow metered addition of the total volume of disperse phase with continuous homogenization, e.g. by means of a high-speed stirrer, high-speed dissolver or a rotor-stator system.

If appropriate, subsequent slow metered addition of the desired residual volume of pure homogeneous phase, if appropriate with continuous homogenization, e.g. by means of a high-speed stirrer, high-speed dissolver or a rotor-stator system.

Method 2:
Initial introduction of the total volume of disperse phase.
Slow metered addition of an optionally highly concentrated particle dispersion in the medium, which later constitutes the homogeneous phase, with constant homogenization, e.g. by means of a high-speed stirrer, high-speed dissolver or a rotor-stator system, where the metered-in volume is such that it comprises the total amount of required finely divided metal oxide particles.

If appropriate, subsequent slow metered addition of the desired residual volume of pure homogeneous phase, if appropriate with constant homogenization, e.g. by means of a high-speed stirrer, high-speed dissolver or a rotor-stator system.

Method 3:
Initial introduction of the total volume of disperse phase.
Slow metered addition of an optionally highly concentrated particle dispersion in the medium, which later constitutes the homogeneous phase, with constant homogenization, e.g. by means of a high-speed stirrer, high-speed dissolver or a rotor-stator system, where the metered-in volume is such that it comprises the total amount of required finely divided metal oxide particles and homogeneous phase.

Method 4:
Initial introduction of the optionally highly concentrated particle dispersion in the medium, which later constitutes the homogeneous phase, where the metered-in volume is such that it comprises the total amount of required finely divided metal oxide particles and homogeneous phase.

Slow metered addition of the total volume of disperse phase with constant homogenization, e.g. by means of a high-speed stirrer, high-speed dissolver, a rotor-stator system and by means of a capillary emulsifier.

Method 5:
Initial introduction of the optionally highly concentrated particle dispersion in the medium, which later constitutes the homogeneous phase, where the metered-in volume is such that it comprises the total amount of required at most partially water-wettable metal oxide particles and homogeneous phase and of the total volume of disperse phase.

Common homogenization, e.g. by means of a high-speed stirrer, high-speed dissolver or a rotor-stator system.

Preference is given to methods 1 and 2, while particular preference is given to method 1. The described methods can be carried out either in a continuous manner or else in a discontinuous manner. Preference is given to a continuous process.

The temperature of the liquid phase during the emulsification process is between 0° C. and 80° C., preferably between 10° C. and 50° C., and more preferably between 20° C. and 40° C.

The emulsification process can be carried out at atmospheric pressure, i.e. at 900 to 1100 hPa, at increased pressure or in vacuo. Preference is given to conducting the process at atmospheric pressure.

The preparation of the finely disperse dispersion of the finely divided particles in the liquid which forms the homogeneous phase in the emulsion can take place in principle according to known methods for the preparation of particle dispersions, such as incorporation by means of stirring elements with a high shear effect, such as high-speed stirrers, high-speed dissolvers, rotor-stator systems, ultrasound dispersers or ball or bead mills.

The concentration of the finely divided metal oxide particles in the dispersion is between 1 and 80% by weight, preferably between 10 and 60% by weight, more preferably between 10 and 40% by weight and most preferably between 12 and 30% by weight.

Starting from the particle-stabilized emulsion described above, the particles according to the invention can be obtained according to the following method:

The particle-stabilized Pickering emulsion described above with a mass fraction of the oil phase of from 0.1% by weight to 80% by weight, preferably 10% by weight to 75% by weight, more preferably from 15% by weight to 60% by weight and in a specific embodiment from 20% by weight to 50% by weight, a mass fraction of the finely divided metal oxide particles of from 0.1% by weight to 20% by weight, preferably 0.5% by weight to 15% by weight and more preferably from 1% by weight to 10% by weight, and a mass fraction of water of from 10% by weight to 99.8% by weight is stirred at low shear, for example by means of a low-speed dissolver, rotor-stator or paddle stirrer, or shaken by means of suitable aggregates, until complete internal crosslinking of the particles is achieved.

The duration of this process step is preferably shorter than 120 h, it is preferably between 0 h and 48 h, more preferably 0.1 h to 24 h and, in a specific embodiment, 0.25 h to 12 h.

If appropriate, catalysts which increase the rate of and/or complete the crosslinking, as specified above, can be added to the reaction mixture. The addition can take place here before the preparation of the Pickering emulsion directly into the oil phase or water phase, during the emulsification or may be subsequently added into the finished Pickering emulsion. The amount of the optionally added catalysts is in the range typical for catalysts.

The reaction temperature during the stirring phase is between 0° C. and 150° C., preferably between 10° C. and 80° C. and more preferably between 15° C. and 60° C.

If appropriate, the reaction can be carried out under an inert gas atmosphere, such as nitrogen, argon or carbon dioxide. The oxygen fraction is then less than 15% by volume, preferably less than 10% by volume and more preferably less than 5% by volume.

The pH of the reaction mixture is between pH 10 and 1, preferably between pH 9 and 2, more preferably between pH 7 and 2 and, in a specific embodiment, between pH 6 and 2.5.

If appropriate, water-soluble organic solvents, for example alcohols such as methanol, ethanol or isopropanol, ketones such as acetone or MEK, ethers such as THF, or others may be added to the dispersion of the particles according to the invention. These can be added either directly after the preparation of the Pickering emulsion, during the reaction phase or after the reaction phase.

If appropriate, dispersion auxiliaries, protective colloids, surfactants or the like may be added to the dispersion of the particles according to the invention. These can either be added directly after the preparation of the Pickering emulsion, during the reaction phase or after the reaction phase.

Preferably, the dispersion of the particles according to the invention comprises less than 5% by weight of dispersion auxiliaries, protective colloids, surfactants or the like, more preferably less than 1% by weight of dispersion auxiliaries, protective colloids, surfactants or the like, and most preferably less than 0.1% by weight of dispersion auxiliaries, protective colloids, surfactants or the like and, in a specific embodiment, is free of dispersion auxiliaries, protective colloids, surfactants or the like.

If appropriate, inorganic or organic electrolytes may be added to the dispersion of the particles. These can be added either directly after the preparation of the Pickering emulsion, during the reaction phase or after the reaction phase. The ionic strength of the dispersion is between 0.01 mmol/l and 1 mol/l, preferably between 0.1 mmol/l and 500 mmol/l and more preferably between 0.5 mmol/l and 100 mmol/l.

If appropriate, additional hydrophobizing agents, such as silanes or siloxanes as described above, may be added to the dispersion of the particles according to the invention. These can be added either directly after the preparation of the Pickering emulsion, during the reaction phase or after the reaction phase.

The solids fraction of the particles in the dispersion, consisting of the sum of the particulate solids used and of the crosslinked polymer phase, is between 0.1% by weight and 99% by weight, preferably between 5% by weight and 90% by weight and more preferably between 10% by weight and 80% by weight.

If appropriate, the dispersion can furthermore be stored with stirring after the reaction phase. This can take place, for example, by means of paddle or anchor stirrers.

If appropriate, the particles according to the invention can be isolated in powder form from the dispersion. This can take place, for example, by means of filtration, sedimentation, centrifugation or by removing the volatile constituents by drying in ovens or dryers, by spray-drying, or by applying an appropriate vacuum. Preference is given to spray-drying.

The particles according to the invention are in particular characterized in that they have a mean particle diameter $x_{50}$ of from 0.5 to 500 μm, preferably 0.8 to 100 μm and particularly more preferably from 1 to 50 μm, measured by means of Fraunhofer laser diffraction using a Helos/BF laser diffraction instrument from Sympatec in cell measurement technology.

The particles according to the invention are in particular characterized in that they are hydrophobic. This means that the isolated dried particles have a methanol number of greater than 20, preferably 30 to 99, and more preferably from 40 to 95.

The particles according to the invention are in particular characterized in that the mean particle size of the finely divided particulate solids used is less than the mean particle size of the polymer particles without particulate solid. The mean particle diameter of the polymer particles $d_{poly}$ without particulate solid can be obtained from transmission electron micrographs (see FIGS. 1 and 2) from thin sections of embedded particles according to the invention. The quotient of the mean particle diameter of the polymer particles $d_{poly}$ without particulate solid and the hydrodynamic equivalent diameter $d_{part}$ of the particulate solids used $d_{poly}/d_{part}$ is greater than 1, preferably between 1.5 and 7000, more preferably between 2.5 and 1500.

The particles according to the invention are in particular characterized in that the particulate solids used are essentially bonded to the surface of the polymer particles. The distribution of the particulate solids used can be obtained from transmission electron micrographs of thin sections of embedded particles according to the invention (see FIGS. 1 and 2).

Preferably, the particulate solids used are chemically bonded to the surface of the polymer particles, for example by a chemical reaction of the organosilicon polymeric constituents of the particles according to the invention with surface OH groups of the particulate solids used. The chemical reaction between the organosilicon polymeric constituents of the particles according to the invention and the surface OH groups of the particulate solids used can be detected, for example, by means of solid-state NMR spectroscopy.

The particles according to the invention are in particular characterized in that they have a microstructured surface. Here, the averaged quotient of the diameter of the particles according to the invention and the thickness of the structured surface layer, in each case obtained from electron micrographs such as TEM or REM, is greater than 1, preferably the quotient is between 2.5 and 10,000, more preferably between 3 and 5000 and, in a specific embodiment, between 3 and 2000 (see FIGS. 1 and 2). In particular, the mean surface structure parameter $<D_{part}/d_1>$ is greater than 1, preferably between 2.5 and 10,000, more preferably between 3 and 5000 and, in a specific embodiment, between 3 and 2000. The mean surface structure parameter $<D_{part}/d_1>$ is determined from transmission electron micrographs of thin sections of particles embedded in synthetic resin. Here, the diameter of the overall particle $D_{part}$ and the overall thickness of the structured surface layer $d_1$ is measured from 50 randomly selected particles. The mean surface structure parameter $<D_{part}/d_1>$ then arises from $$\langle D_{part}/d_1 \rangle = \frac{\sum_{i=1}^{i=50}(D_{part}/d_1)_i}{50}.$$

The particles according to the invention are in particular characterized in that they have a non-smooth surface. This means that the fractal dimension of the surface $D_s$ is preferably greater than 2, more preferably 2.1 to 3.0, where the fractal dimension of the surface $D_s$ is defined here as:

Particle surface A is proportional to the particle radius R to the power of $D_s$. The fractal dimension of the mass can be obtained from a double-logarithmic plot of the scatter vector Q against the intensity I(Q), obtained from small-angle scatter experiments.

The particles according to the invention are preferably used in coating materials or impregnation compositions in order to produce surface structures on the substrates onto which the coating materials are applied. Here, in contrast to the particles according to the prior art, the particles according to the invention offer the possibility of producing elevations which have an additional substructure firmly anchored to their surface.

In order to ensure a solid anchoring of the particles on the surface, preferably at least one organic or one inorganic binder or a combination of binders is co-used in such preparations. The precise height of an elevation which is produced by a particle according to the invention is approximately the difference between the layer thickness which the film from the binder film produces on the surface and the particle diameter of the particle according to the invention used in each case. This approximation is more precise the more exact the particle according to the invention lies on the substrate itself and not on other co-used auxiliaries. In the latter case, the height of the auxiliary on which the particle lies contributes to the height of the elevation.

If the surface coating compositions which are prepared using the particles according to the invention are to produce a so-called lotus structure, then they comprise yet further spherical particles which have a size of from 50 nm to 500 nm and are hydrophobic. Suitable particles of this type are all colloidal hydrophobic particles of inorganic, e.g. oxidic or organic, e.g. polymeric material which have the corresponding particle size. Examples of such particles are silicas, such as fumed silica, precipitated silica or silica gel which have a hydrophobic surface coating, condensed and agglomerated silicone resin particles or in general the finely divided metal oxides already mentioned above which stabilize the siloxanes or silane phase.

To produce a so-called lotus structure in which the surface structure of the particles according to the invention is utilized, it is to be ensured when selecting the type and amount of the binder used that the particles according to the invention are not completely surrounded by the binder film and no longer appear toward the outside. Although they can then effect a strengthening of the film and improve its mechanical strength, they only contribute to a minor extent, if at all, to surface effects. In order to achieve a combination of surface activity of the particles and mechanical loadability, i.e. abrasion resistance of the surface coats produced, technologies as are used, for example, for producing emery paper are recommended. There too, the particles protrude beyond the binder coat and are nevertheless anchored in it in an abrasion-resistant manner. In order to achieve such an abrasion-resistant surface structure, it has proven advantageous to dimension the amount of binder such that the particles according to the invention protrude 33% to 66% from the binder film. Since the particles to be co-used which form a fine structure between the particles according to the invention are smaller than the particles according to the invention, these are to be selected such that they themselves float in the binder and are fixed in the surface, or suitable additives are to be chosen, such as wetting agents or dispersants, which help to configure the compatibility and the floating behavior of the co-used smaller particles such that they float on the surface.

Typical binders that can be used are preferably monomeric, oligomeric and polymeric acrylates, methacrylates and copolymers which contain acrylate and/or methacrylate fractions, oligomeric and polymeric epoxides, oligomeric and polymeric polyurethanes, saturated and unsaturated (poly)ethers and (poly)esters, aromatic aliphatic and cycloaliphatic polyolefins, polyvinylbutyrals, polyvinyl alcohols, polyamides, polyimides, polycarbonates, polyaminoamides, polymers containing phosphonic acid and sulfonic acid, organically functionalized organic polymers and copolymers which may be carboxylic-acid-functionally, hydroxy-functionally, tri-, di- and monoamino-functionally, epoxy-functionally, mercapto-functionally, anhydride-functionally or mixed organically functionalized, polymeric phosphoric acid esters, phenol formaldehyde condensation products, melamine-containing copolymers, silicone resins, silicone elastomers, alkali metal and alkaline earth metal siliconates, alkali metal and alkaline earth metal waterglasses, reactive, crosslinkable silicone oils, reactive, crosslinkable silanes, in each case in pure form or as preparation in solvents or in aqueous phase as emulsion, dispersion or solution, and combinations thereof obtained by mixing and/or copolymerization, cocondensation or polyaddition of the monomeric units of which they are composed. The invention also provides surface coating, molding, fiber materials or textile surfaces, where these have a hydrophobicity with a contact angle measured in air toward water of greater than 90°.

The use of the particles according to the invention in coating compositions, impregnation compositions and other surface treatment compositions for increasing the hydrophobicity and for lowering the susceptibility to soiling is likewise provided by the invention.

Apart from for the purpose of producing structured surfaces, the particles according to the invention can be used for the purpose of corrosion protection on metals and for the manipulation of further properties of preparations which comprise the particles according to the invention or of solid bodies or films which are obtained from preparations which comprise the particles according to the invention, they further serve, for example, for:

- controlling the electrical conductivity and the electrical resistance
- controlling the flow properties of a preparation
- controlling the shine of a damp or cured film or of an object
- reducing the soiling tendency
- increasing the weathering resistance
- increasing the chemical resistance
- increasing the color stability
- reducing the chalking tendency
- reducing or increasing the static friction and sliding friction on solid bodies or films obtained from preparations which comprise particles according to the invention
- stabilizing or destabilizing foam in preparations which comprise the particles according to the invention
- improving the adhesion of preparations which comprise the particles according to the invention to substrates on or between which the preparations which comprise the particles according to the invention are applied,
- controlling the filler and pigment crosslinking and dispersion behaviors,
- controlling the rheological properties of the preparation which comprises the particles according to the invention,
- controlling the mechanical properties, such as, for example, flexibility, scratch resistance, elasticity, extendibility, bendability, tear behavior, rebound behavior, hardness, density, further tear resistance, compression set, behavior at different temperatures, expansion coefficient, abrasion resistance, and further properties, such as the heat conductivity, flammability, gas permeability, resistance to water vapor, hot air, chemicals, weathering and radiation, the sterilizability, of solid bodies or films obtainable from preparations which comprise the particles according to the invention
- controlling the electric properties, such as, for example, dielectric loss factor, disruptive strength, dielectric constant, creep resistance, arc resistance, surface resistance, specific disruptive resistance,
- flexibility, scratch resistance, elasticity, extendibility, bendability, tear behavior, rebound behavior, hardness, density, further tear resistance, compression set, behavior at different temperatures of solid bodies or films obtainable from preparations which comprise the particles according to the invention.

Examples of applications where the particles according to the invention can be used in order to manipulate the properties referred to above are the manufacture of cleaners, polishes, and also coating materials and impregnations and coatings and coverings obtainable therefrom on substrates such as metal, glass, wood, mineral substrate, synthetic and natural fibers for producing textiles, carpets, floor coverings, or other goods that can be produced from fibers, leather, artificial leather, plastics such as films, moldings. Examples of natural fiber materials are wool, cotton, silk, flax and fibers of regenerated cellulose.

Examples of synthetic fiber materials are polyesters, polyamide, polyacrylonitrile, polyethylene, polypropylene and polyurethane.

Examples of inorganic fiber materials are glass fibers and carbon fibers.

Compositions which comprise the particles according to the invention can be applied to the fibers per se or to yarns and textile surfaces produced therefrom.

Textile surfaces which can be treated with compositions comprising the particles according to the invention are, for example, wovens, drawn-loop knits, formed-loop knits, scrims, braids, sewn knits and nonwovens.

The application of compositions comprising the particles according to the invention with structured surface to the substrates to be coated or to substrates to be impregnated or surfaces thereof can be carried out in any desired manner in many cases known and suitable for producing coatings and/or impregnations from liquid materials, for example by immersion, coating, pouring, spraying, rolling, printing, e.g. by means of an offset gravure coating device, knife or doctor coating or by means of an airbrush.

Incorporation into synthetic fiber materials can take place by extruding the particles according to the invention or a masterbatch consisting of the particles according to the invention and the fiber material. The particles according to the invention with structured surface can likewise be introduced into the shell of bicomponent fibers. The fiber polymers of core and shell can here be identical or different in nature.

The particles according to the invention can be used in preparations upon appropriate selection of the preparation components, moreover, as additive for the purpose of defoaming, of flow promotion, hydrophobization, hydrophilization, filler and pigment dispersion, filler and pigment wetting, substrate wetting, promoting surface smoothness, reducing the static resistance and sliding resistance on the surface of the cured mass obtainable from the added preparation. The particles according to the invention can be incorporated into elastomer materials. Here, they can be used for the purpose of strengthening or for improving other use properties, such as controlling the transparency, the heat resistance, the yellowing tendency, the weathering resistance. Possible fields of use of the new preparation are: coatings of textile surfaces such as, for example, wovens, nonwovens, drawn-loop knits, scrims, felts, formed-loop knits or warp knits. The textile surfaces can be fabricated from natural fibers, such as cotton, wool, silk etc. or else from synthetic fibers such as polyester, polyamide, aramid, etc. The textiles can also be fabricated from mineral fibers such as glass or silicates or metal fibers.

The textile surfaces coated with the compositions comprising the particles according to the invention can be used for technical applications such as, for example, conveyor belts, bellow expansion joints, protective clothing, awnings, insulation sector or airbags.

However, the compositions comprising the particles according to the invention can also be used in the high-performance textile sector, such as hanggliders, hot air balloons, parachutes, outdoor clothing, sport textiles, leisure clothing, leisure articles, such as tents or rucksacks, sails and streetwear.

The described products can also be used for the coating of films or surfaces made of mineral substances, synthetic substances, natural substances or metals.

Furthermore, the described compositions can be used for producing molded articles.

Furthermore, many substrates, such as, for example, paper, mineral construction materials, plastics, wood and many other substrates, can be treated with the formulations according to the invention.

The application of the formulations according to the invention produced in this way to textile materials takes place by methods customary in the textile finishing industry, such as slop-padding, immersion with or without subsequent padding, knife coating or coating by roller application, screen printing, paint-brushing or screen rolling, extrusion methods, injection or spraying methods, or are applied in any other desired manner. All types of roll coatings, such as gravure rolling, slop-padding or application via multiroller systems are also possible.

The described compositions are also suitable for lamination and for processing in transfer methods.

Molded articles can be produced in injection molding or casting methods.

The drying and vulcanization takes place in customary heating channels which can be heated by hot air or infrared radiation or other energy sources. The preferred temperature range is 50-200° C. Since some types of textile are not particularly thermally resistant, the upper temperature limit is in most cases limited by the thermal resistance of the textile. The residence time in the drying oven is dependent on the temperature in the heating channel and is preferably 0.5 to 30 minutes.

Fabrics made of glass fibers fray at the cutting places to a very great degree, fraying of the cut edges is prevented by the treatment. Glass dust which arises as a result of the breakage of the fine glass fibers is fixed by finishing with the formulations according to the invention. Furthermore, glass fabric finished in such a way exhibits elastic properties.

FIGURES

Figure 2:
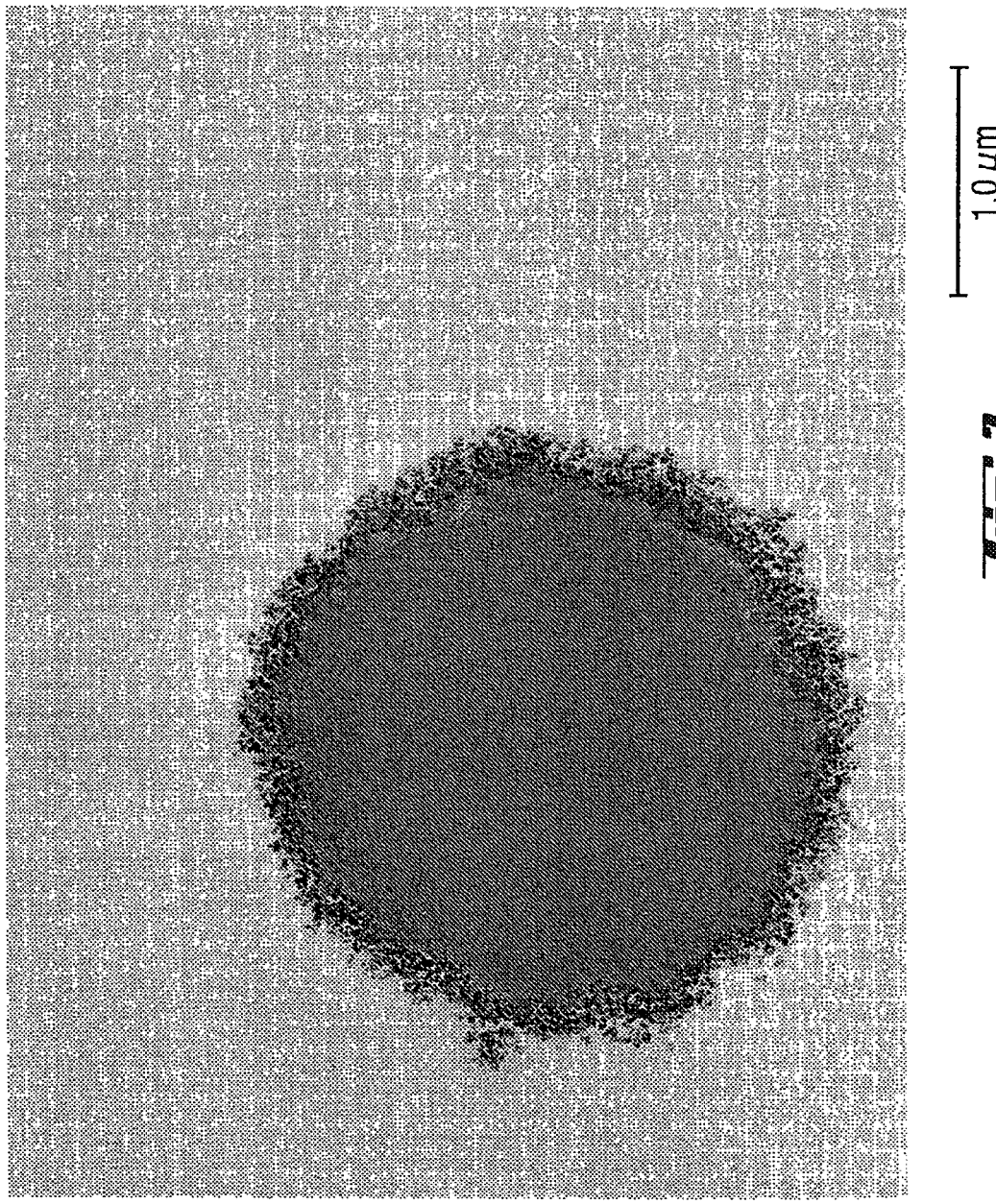

FIGS. 1 and 2 show transmission electron micrographs of the particles according to the invention.

EXAMPLES

1. Example a) Preparation of an Aqueous Silica Dispersion 300 g of a partially hydrophobic fumed silica with a residual silanol content of 71% and a carbon content of 0.95%, obtained by reacting a hydrophilic starting silica with a specific BET surface area of 200 m$^2$/g (obtainable under the name HDK® N20 from Wacker-Chemie GmbH, Munich) with dimethyldichlorosilane as in EP 1433749 A1, are stirred in portions into 1000 g of completely demineralized (demin.) water in a dissolver at 300-600 rpm. Here, the pH of the dispersion is kept in a range from 9-9.5 through the metered addition of aqueous NaOH. Following the complete addition of the silica, the mixture is afterdispersed for a further 30 min at 6000 rpm. The resulting low viscosity dispersion is then pumped through an ultrasound through-flow cell (Hielscher; 24 kHz; 400 W) at a throughflow rate of 5-10 ml/min. This gives a thin-liquid silica dispersion.

b) Preparation of a Pickering Emulsion 100 g of the silica dispersion described in example 1a) with a solids content of 23% by weight are initially introduced into a 1000 ml stainless steel beaker. By adding aqueous HCl, a pH of about 4 is established. 300 g of a methoxy-group-containing oligomeric condensation product of methyltrimethoxysilane with a molecular weight of Mw=1200 and a methoxy group content of about 30% by weight are slowly metered in to the now more highly viscous suspension with stirring at 10,000 rpm using an Ultraturrax and water cooling over a period of about 15 min. During this, the temperature of the mixture should not exceed 60° C. 220 g of demin. water are then added to this now highly viscous firm-consistency mass likewise at 10,000 rpm over a period of 5 min. During this, the temperature of the mixture should not exceed 60° C. This gives a thin-liquid white 0/W emulsion.

c) Preparation of the Particles According to the Invention 3 g of p-toluenesulfonic acid are added with stirring to 500 g of the Pickering emulsion described under example 1b). The reaction mixture is stirred at 1000 rpm for 3 h and a temperature of 50-60° C. using a dissolver (Getzmann). This gives a white thin-liquid dispersion, the analytical data for which are summarized in table 1.

TABLE 1

| Solids content | x50 value | Methanol number | $<D_{part}/d_1>$ |
|---|---|---|---|
| 50% by wt. | 9.23 μm | 53 | 8.5 |

Solids content: 10 g of aqueous dispersion are admixed with the same amount of ethanol in a porcelain dish and evaporated to constant weight in an $N_2$-flushed drying cabinet at 150° C. The mass $m_s$ of the dry residue gives the solids content according to solids content/%=$m_s$*100/10 g.

Mean particle diameter (x50 value): determination of the d50 value by means of laser diffraction and evaluation of the measurement results according to the Fraunhofer theory in a Helos/BF from Sympatec in cell measurement technology.

Methanol number: to determine the methanol number, defined mixtures of water with methanol are prepared. In a separate experiment, these water-methanol mixtures are coated with defined amounts of dried particles and shaken under defined conditions (for example gentle shaking by hand or using a tumble mixer for about 1 minute). The water-alcohol mixture in which the particles just still do not sink in and the water-alcohol mixture with a higher alcohol content in which the particles just sink in are determined. The latter methanol content in water gives the methanol number.

Mean surface structure parameter $<D_{part}/d_1>$: the diameter of the overall particle $D_{part}$ and the overall thickness of the structured surface coat $d_1$ are determined from transmission electron micrographs of thin sections of particles embedded in synthetic resin from 50 randomly selected particles. The mean surface structure parameter $<D_{part}/d_1>$ then arises from $$\langle D_{part}/d_l \rangle = \frac{\sum_{i=1}^{i=50}(D_{part}/d_l)_i}{50}.$$

2. Application Examples 2.1. Production of Preparations for Impregnation and Coating which Comprise the Particles According to the Invention a) A 20 percent strength by weight aqueous dispersion of particles according to the invention, prepared by the procedure as described in example 1, is initially introduced into a stainless steel beaker. A 20 percent strength by weight aqueous dispersion of a carboxy-functional polyacrylate neutralized with ammonia is added with stirring using a dissolver (4500 revolutions per minute). The polyacrylate is adjusted so that it is self-emulsifying, with 0.2 percent by weight, based on the solids content, of sodium dodecyl sulfonate being added to increase the dispersion stability. The particle size of the polyacrylate was adjusted to below 100 nm. Directly following the addition of the polyacrylate dispersion, the viscosity increases considerably. In order to obtain a thin-liquid preparation that can be applied by knife-coating, the mixture is diluted with water to a processable viscosity. The entire process lasts 20 minutes. During the entire time, the mixture is stirred at a constant speed using the dissolver. The quantitative ratios of particle dispersion and polyacrylate dispersion are chosen so that there are 5 parts of solid bodies of the particle dispersion per 1 part of solid bodies of the polyacrylate dispersion.

b) The procedure is analogous to example a) where now the ratio of particle dispersion to polyacrylate dispersion is now chosen such that there are 6 parts of solid bodies of the particle dispersion per 1 part of solid bodies of the polyacrylate dispersion.

c) The procedure is analogous to example a) where now the ratio of particle dispersion to polyacrylate dispersion is now chosen such that there are 7 parts of solid bodies of the particle dispersion per 1 part of solid bodies of the polyacrylate dispersion.

d) The procedure is analogous to example a) where now the ratio of particle dispersion to polyacrylate dispersion is now chosen so that there are 8 parts of solid bodies of the particle dispersion per 1 part of solid bodies of the polyacrylate dispersion.

e) A 20 percent strength by weight aqueous dispersion of particles according to the invention, prepared according to the procedure as described in example 1, is initially introduced into a stainless steel beaker. A 50 percent strength by weight emulsion of a methyl silicone resin which has been prepared from 100 parts of methyltrichlorosilane and 15 parts of dimethyldichlorosilane by ethanolic hydrolysis and subsequent condensation, where the methyl silicone resin has a molecular weight mean Mw of 6500, and carries 6% ethoxy groups and 1% hydroxy groups, is added with stirring using a dissolver (4500 revolutions per minute). During mixing, there is no increase in viscosity. The total operation lasts 15 minutes. During the entire time, the mixture is stirred at a constant speed using the dissolver. The quantitative ratios of particle dispersion and silicone resin emulsion are selected so that there are 5 parts of solid bodies of the particle dispersion per 1 part of solid bodies of the silicone resin emulsion.

f) A 20 percent strength by weight aqueous dispersion of particles according to the invention, prepared by the procedure as described in example 1, is initially introduced into a stainless steel beaker. A 31 percent strength by weight emulsion of an alpha omega hydroxy-functional polydimethylsiloxane with a viscosity of 80 000 mPas at 25° C. and auxiliaries (obtainable by a 1:1 dilution of Finish CT 27 E from Wacker Chemie GmbH with water) is added with stirring using a dissolver (4500 revolutions per minute). No increase in the viscosity is observed. The total operation lasts 15 minutes. During the entire time, the mixture is stirred at a constant speed using the dissolver. The quantitative ratios of particle dispersion and polydimethylsiloxane emulsion are chosen such that there are 5 parts of solid bodies of the particle dispersion per 1 part of solid bodies of the polydimethylsiloxane emulsion.

g) A mixture is prepared from the polyacrylate dispersion from example a)-d) and the 30 percent strength by weight polydimethylsiloxane emulsion from example g) by combining the two preparations 1:1 with stirring.

A 20 percent strength by weight aqueous dispersion of particles according to the invention, prepared by the procedure as described in example 1, is initially introduced into a stainless steel beaker. The binder mixture is added with stirring using a dissolver (4500 revolutions per minute). An increase in the viscosity is observed, meaning that water is added until a knife-coatable viscosity is obtained. The total operation lasts 25 minutes. During the entire time, the mixture is stirred at a constant speed using the dissolver. The quantitative ratios of particle dispersion and mixture of polyacrylate dispersion and polydimethylsiloxane emulsion are chosen so that there are 5 parts of solid bodies of the particle dispersion per 1 part of solid bodies of the mixture.

Note: In the case of all of the preparations, thickening occurs to a greater or lesser extent after a short time. Thin-liquid mixtures are obtained again from the thickened samples through stirring. The preparations exhibit thixotropy.

2.2. Application of the Preparations from 2.1. and Determination of the Contact Angle a) Impregnations of mineral substrates and coatings on glass: the preparations from examples 2.1. a)-g) are applied using a 20 μm spiral knife coater to in each case a lime sandstone, a fiber cement plate and a glass plate. Drying is carried out for 4 hours at 23° C., 60% relative atmospheric humidity. The dry layer thicknesses on the glass plate are determined. They are between 5 and 8 μm depending on the concentration of the particular preparation. Contact angle measurements are carried out on the coverings on glass plates. The following values are obtained:

| Sample | Layer thickness, dry | Contact angle (water drop) |
|---|---|---|
| 2.1.a | 6 μm | 123° |
| 2.1.b | 5 μm | 126° |
| 2.1.c | 6 μm | 128° |
| 2.1.d | 6 μm | 131° |
| 2.1.e | 8 μm | 122° |
| 2.1.f | 8 μm | 123° |
| 2.1.g | 7 μm | 123° |

In contrast to the coverings on glass, the binders of the preparations a)-g) essentially penetrate into the substrate, like impregnation agents, when they are applied to the mineral surfaces of the lime sandstone and the fiber cement plates. The particle positions on the surface can be identified from a slight whitish coloration. A chalk test of the impregnated samples in accordance with ASTM D 4214 produced no chalking in the case of examples a)-c) and e)-g) and slight chalking in the case of example d). The test was carried out both with the lime sandstone and the fiber cement plates. The impregnated surfaces are thus mechanically stable, the particles according to the invention from the preparations do not lie loosely on the surface, but are bonded to it.

Water was trickled perpendicularly onto the lime sandstone and the fiber cement plates placed obliquely at an angle of 45°. The water beads off on the surface. Wetting is not observed.

In contrast to this, with the polyacrylate dispersion from examples a)-d), the silicone resin emulsion from example e), the polydimethylsiloxane emulsion from example f), and the mixture from example g), wetting of the freshly impregnated and dried mineral surfaces is observed.

The invention claimed is:

1. A method for producing particles comprising a core of a solid polymerization product of a polyaddable, polycondensable or polymerizable siloxane, silane, or mixture thereof and a shell of silylated fumed silica particles, where the mean particle size of the silylated fumed silica particles is smaller than the mean particle size of the core, and wherein the silylated fumed silica particles are chemically bonded to the surface of the core, the method comprising:

emulsifying an oil phase comprising at least one polyaddable, polycondensable or polymerizable siloxane comprising units of the formula (1)

$$[A^1_z R^1_p SiO_{(4-p-z)/2}] \quad (1),$$

where
- $A^1$ is a hydrogen or hydrocarbon radical which contains up to 30 carbon atoms and optionally contains heteroatoms selected from O, S, Si, Cl, F, Br, P or N atoms, wherein $A^1$ is also a functional group which is optionally substituted,
- $R^1$ is an alkoxy or aryloxy radical having up to 18 carbon atoms, a hydroxy radical or H, or which can have the meaning of $A^1$,
- z and p are independently 0, 1, 2 or 3 or comprises a polyaddition product, condensation product or polymerization product of at least one polyaddable, polycondensable or polymerizable silane of the formula (2),

$$(R^2)_{4-n}-Si-(OR^3)_n \quad (2)$$

where n is 1, 2, 3 or 4,
- $R^2$ each individually is a linear or branched alkyl radical having 1 to 16 carbon atoms, where nonadjacent carbon atoms are optionally replaced by oxygen atoms, is an aryl radical, or is an organofunctional radical selected from the group consisting of phosphonic acid monoester radicals, phosphonic acid diester radicals, the phosphonic acid radical, the methacryloyloxy radical, the acryloyloxy radical, the vinyl radical, the mercapto radical, the isocyanato radical, where the isocyanato radical is optionally blocked, the hydroxy radical, hydroxyalkyl radicals, the vinyl radical, the epoxy radical, the glycidyloxy radical, the morpholino radical, the piperazino radical, a primary, secondary or tertiary amino radical with one or more nitrogen atoms, where the nitrogen atoms are optionally substituted by hydrogen or monovalent aromatic, aliphatic or cycloaliphatic hydrocarbon radicals, carboxylic acid radicals, carboxylic anhydride radicals, aldehyde radicals, urethane radicals, or urea radicals, where the radicals $R^2$ are bonded directly to the silicon atom or are separated therefrom by a carbon chain of 1-6 carbon atoms, and
- $R^3$ is a monovalent linear or branched aliphatic or cycloaliphatic hydrocarbon radical in which nonadjacent carbon atoms are optionally replaced by heteroatoms selected from the group consisting of O, N, P, S, Cl, F, Br and Si, where the free valences of the heteroatoms are optionally saturated by linear or branched alkyl radicals or by hydrogen atoms, or is a monohydric aromatic hydrocarbon radical or a radical of the form $-C(=O)-R^3$ where $R^3$ is a monovalent linear or branched aliphatic or a cycloaliphatic hydrocarbon radical or a monovalent aromatic hydrocarbon radical, where the silane(s) are present in nonhydrolyzed form, in hydrolyzed form, in hydrolyzed and partially condensed form, or in hydrolyzed and condensed form, or in a mixture of these forms, or a plurality of such siloxanes of the formula (1) and/or silanes of the formula (2)

with silylated fumed silica particles in aqueous medium, and crosslinking the polyaddable, polycondensable, or polymerizable siloxane, silane or mixture thereof to form particles having a core of solid polymer particles and having a shell of silylated fumed silica particles chemically bonded to the surface of the core.

2. The method for producing particles of claim 1, wherein the mass fraction of the silylated fumed silica particles in a dispersion used for emulsification is between 1 and 80% by weight, based on the total emulsion weight.

3. The method for producing particles of claim 1, wherein, in the emulsion, the mass fraction of the oil phase is 0.1% by weight to 80% by weight, the mass fraction of the silylated fumed silica particles is 0.1% by weight to 20% by weight, and the mass fraction of water is 10% by weight to 99.8% by weight, based on the total emulsion weight.

4. The method of claim 1, wherein an oil phase comprising a polyaddable, polycondensable or polymerizable siloxane of the formula (1) or comprising a polyaddable, polycondensable or polymerizable silane of the formula (2) is polymerized and crosslinked.

5. A composition comprising particles prepared by the process of claim 1.

6. A surface coating, comprising particles prepared by the process of claim 1.

7. A molding, comprising particles prepared by the process of claim 1.

8. A surface coating or molding comprising particles prepared by the process of claim 1, which has a hydrophobicity with a contact angle measured in air toward water of greater than 90°.

9. A fiber material comprising fibers and particles prepared by the process of claim 1.

10. A textile surface, comprising particles prepared by the process of claim 1.

11. A building coating, comprising particles prepared by the process of claim 1.

12. The method of claim 1, wherein the polyaddable, polycondensable or polymerizable siloxane or silane is crosslinkable by condensation reaction, and wherein following the preparation of an emulsion of the siloxane and silane components and silylated fumed silica particles, a condensation catalyst is added, and crosslinked organopolysiloxane particles with a shell of silylated pyrogenic particles bonded to the surface of a core of crosslinked organopolysiloxane particles are formed.

* * * * *